US012692802B2

(12) United States Patent
Kim et al.

(10) Patent No.: US 12,692,802 B2
(45) Date of Patent: Jul. 28, 2026

(54) TURBINE EXHAUST CASE AND BEARING HOUSING ASSEMBLY

(71) Applicant: PRATT & WHITNEY CANADA CORP., Longueuil (CA)

(72) Inventors: Hyunjae Kim, Yongin-Si (KR); Guy Lefebvre, St-Bruno-de-Montarville (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 18/764,234

(22) Filed: Jul. 4, 2024

(65) Prior Publication Data

US 2026/0009344 A1 Jan. 8, 2026

(51) Int. Cl.
*F01D 25/30* (2006.01)
*F01D 25/16* (2006.01)

(52) U.S. Cl.
CPC ........... *F01D 25/30* (2013.01); *F01D 25/162* (2013.01); *F05D 2230/21* (2013.01); *F05D 2230/25* (2013.01); *F05D 2300/175* (2013.01)

(58) Field of Classification Search
CPC ...... F01D 25/162; F01D 25/164; F01D 25/26; F01D 25/28; F01D 25/30; F01D 9/065; F05D 2230/211; F05D 2230/25; F05D 2300/175
See application file for complete search history.

(56) References Cited

U.S. PATENT DOCUMENTS

| | | | | |
|---|---|---|---|---|
| 3,048,452 | A * | 8/1962 | Addie | F01D 25/265 415/199.5 |
| 3,261,587 | A * | 7/1966 | Rowley | F02C 7/06 415/138 |
| 7,802,962 | B2 | 9/2010 | Sjoeqvist | |
| 8,408,011 | B2 | 4/2013 | Fontaine et al. | |
| 8,827,638 | B2 | 9/2014 | Delitz | |
| 9,243,514 | B2 * | 1/2016 | Krotzer, Jr. | F01D 5/28 |
| 9,689,312 | B2 * | 6/2017 | Sjöqvist | F01D 25/28 |
| 9,759,356 | B2 | 9/2017 | Ott et al. | |
| 9,822,652 | B2 | 11/2017 | Sjoqvist et al. | |
| 10,100,676 | B2 | 10/2018 | Farah et al. | |

(Continued)

FOREIGN PATENT DOCUMENTS

| | | | |
|---|---|---|---|
| CA | 2573342 | A1 | 1/2006 |
| CA | 2701405 | A1 | 10/2010 |

(Continued)

OTHER PUBLICATIONS

European Search Report issued on Dec. 18, 2025 in EP counterpart application No. 25187670.2.

*Primary Examiner* — Courtney D Heinle
(74) *Attorney, Agent, or Firm* — NORTON ROSE FULBRIGHT CANADA LLP

(57) ABSTRACT

A gas turbine engine has a bearing housing concentrically disposed inside the inner case of a turbine exhaust case (TEC). The bearing housing has a tubular body and an outer flange projecting from a radially outer surface of the tubular body. The outer flange has an axially extending segment spaced from the radially outer surface of the tubular body by an annular gap. The axially extending segment has a radially outer end surface connectable, such as by welding, to a mating flange projecting radially inwardly from the inner case of the TEC.

16 Claims, 3 Drawing Sheets

(56) References Cited

U.S. PATENT DOCUMENTS

| | | | |
|---|---|---|---|
| 10,240,485 | B2 | 3/2019 | Grussmann |
| 10,280,790 | B2 | 5/2019 | Mountz et al. |
| 10,815,832 | B2 | 10/2020 | Staffier et al. |
| 11,002,152 | B2 | 5/2021 | Smedresman et al. |
| 11,156,123 | B2 | 10/2021 | Sakamoto et al. |
| 11,313,248 | B2 * | 4/2022 | Demitraszek, Sr. ...... F02C 7/06 |
| 11,319,879 | B2 | 5/2022 | Iwai et al. |
| 11,319,897 | B2 | 5/2022 | Joo et al. |
| 11,629,615 | B2 | 4/2023 | Lefebvre |
| 11,739,663 | B2 | 8/2023 | Kerns et al. |
| 2020/0080435 | A1 * | 3/2020 | Durocher ................ F01D 9/065 |

FOREIGN PATENT DOCUMENTS

| | | | |
|---|---|---|---|
| CA | 3050967 | A1 | 3/2020 |
| EP | 4124725 | B1 | 11/2024 |
| KR | 20210103853 | A | 8/2021 |
| KR | 20210106800 | A | 8/2021 |

* cited by examiner

TURBINE EXHAUST CASE AND BEARING HOUSING ASSEMBLY

TECHNICAL FIELD

The application relates generally to gas turbine engines and, more particularly, to a turbine exhaust case and bearing housing assembly.

BACKGROUND OF THE ART

Various factors exert pressures on turbine engine manufacturers to continually improve their designs. Design improvements take many factors into consideration, such as weight, structural optimization, durability, production costs, etc. Accordingly, while known turbine exhaust case assemblies were satisfactory to a certain extent, there remains room for improvement.

SUMMARY

In one aspect, there is provided an exhaust case assembly for a gas turbine engine, comprising: a turbine exhaust case (TEC) having an outer case extending around a central axis, an inner case concentrically disposed inside the outer case, an annular exhaust gas path radially between the outer case and the inner case, and a plurality of circumferentially spaced-apart struts extending across the annular exhaust gas path and structurally connecting the inner case to the outer case; and a bearing housing concentrically disposed inside the inner case of the TEC, the bearing housing having a tubular body extending around the central axis and an outer annular flange, the outer annular flange having: a first segment projecting radially outwardly from the tubular body, a second segment projecting axially forwardly from the first segment, and a third segment projecting radially outwardly from the second segment to a radially outer circumferential surface, the radially outer circumferential surface of the third segment joined to a corresponding radially inner circumferential surface of a mating flange projecting radially inwardly from the inner case of the TEC.

In another aspect, there is provided a gas turbine engine comprising: a turbine exhaust case (TEC) including an outer case extending around a central axis, an inner case concentrically disposed within the outer case, an annular exhaust gas path radially between the inner case and the outer case, and a plurality of struts extending across the annular exhaust gas path from the inner case to the outer case; and a bearing housing concentrically disposed inside the inner case of the TEC; the bearing housing having a tubular body extending around the central axis and an outer flange projecting from a radially outer surface of the tubular body, the outer flange having an axially extending segment spaced from the radially outer surface of the tubular body by an annular gap, the axially extending segment having a distal end connected to a mating flange projecting radially inwardly from the inner case of the TEC.

In a further aspect, there is provided a method of forming an exhaust case assembly of a gas turbine engine, comprising: casting a turbine exhaust case (TEC); forging a bearing housing with an outer flange including a first segment projecting radially outwardly from a tubular body, a second segment projecting longitudinally around the tubular body and a third segment projecting radially outwardly from the second segment; positioning the bearing housing inside the TEC; and joining, such as by welding, the third segment of the outer flange of the bearing housing to a mating flange projecting radially inwardly from the TEC.

DESCRIPTION OF THE DRAWINGS

Reference is now made to the accompanying figures in which.

DETAILED DESCRIPTION

Figure 1:
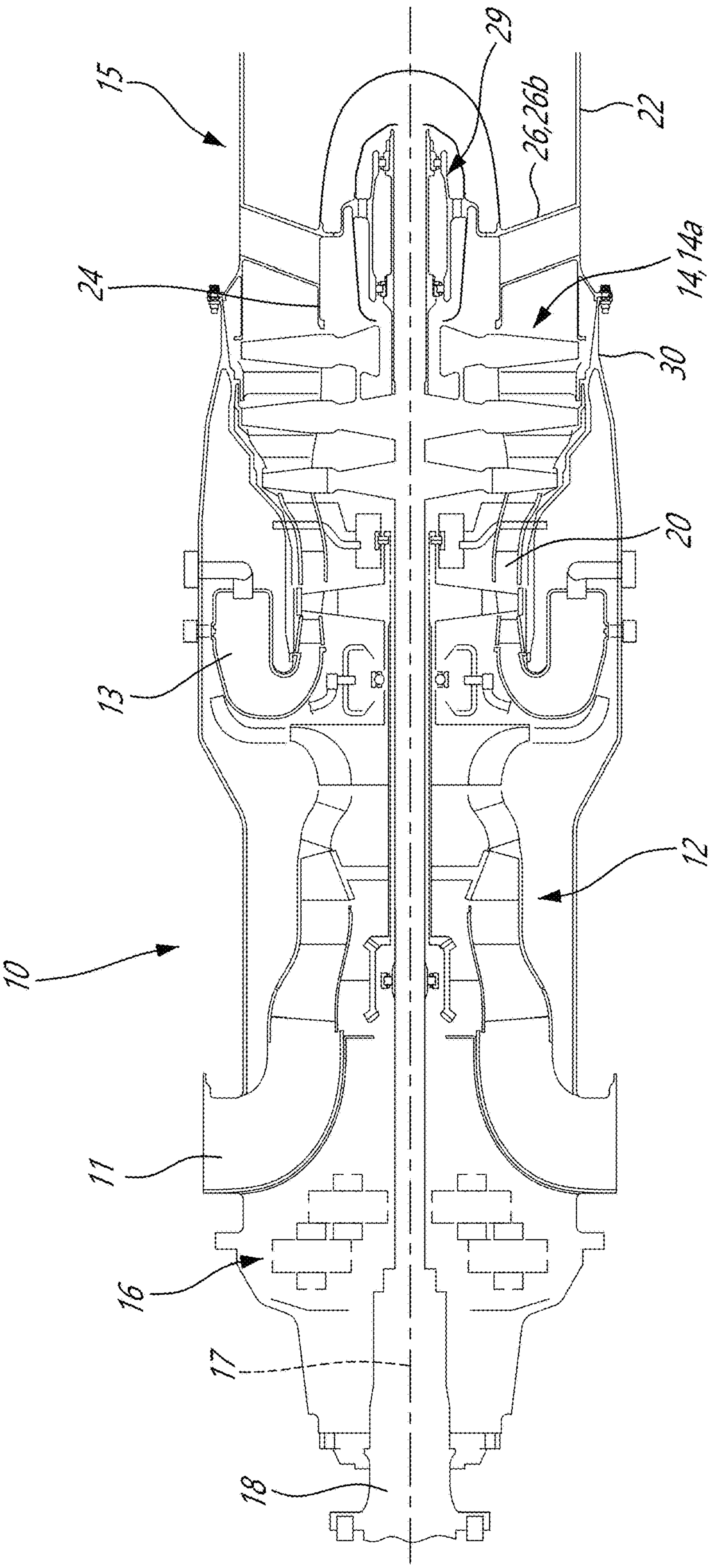
FIG. 1 is a schematic cross section view of a gas turbine engine having an exhaust case assembly including a turbine exhaust case (TEC) and a bearing housing.

FIG. 1 illustrates a gas turbine engine of a type preferably provided for use in subsonic flight, and generally comprising in serial flow communication an air inlet 11, a compressor 12 for pressurizing the air from the air inlet 11, a combustor 13 in which the compressed air is mixed with fuel and ignited for generating an annular stream of hot combustion gases, a turbine 14 for extracting energy from the combustion gases, and a turbine exhaust case (TEC) 15 through which the combustion gases exit the engine 10. The turbine 14 includes a low pressure (LP) or power turbine rotor **14*a* mounted inside a turbine case 30 and drivingly connected to an input end of a reduction gearbox (RGB) 16. The RGB 16 has an output end drivingly connected to an output shaft 18 configured to drive a rotatable load (not shown). For instance, the rotatable load can take the form of a propeller or a rotor, such as a helicopter main rotor. According to the illustrated embodiment, the compressor and the turbine rotors are mounted in-line for rotation about a central axis also herein referred to as the engine centerline 17**.

While the exemplary engine shown in FIG. 1 is embodied in the form of a turboshaft or turboprop engine, it is understood that the present disclosure is not limited to these specific types of aircraft engines. For instance, the gas turbine engine could be embodied in the form of a turbojet engine, a turbofan engine, a pulse-jet engine, a ramjet engine, just to name a few.

Figure 2:
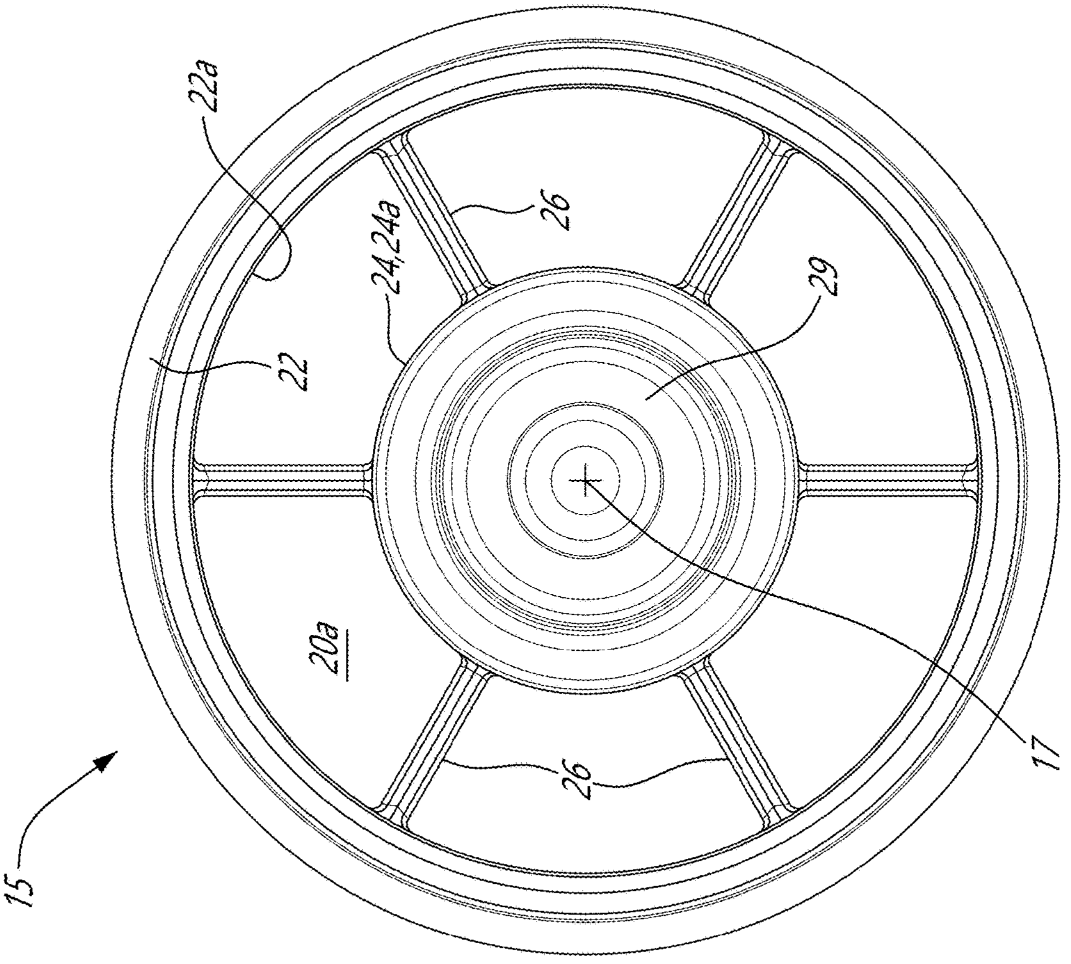
FIG. 2 is an end view of the exhaust case assembly illustrating the bearing housing inside the TEC.
Figure 3:
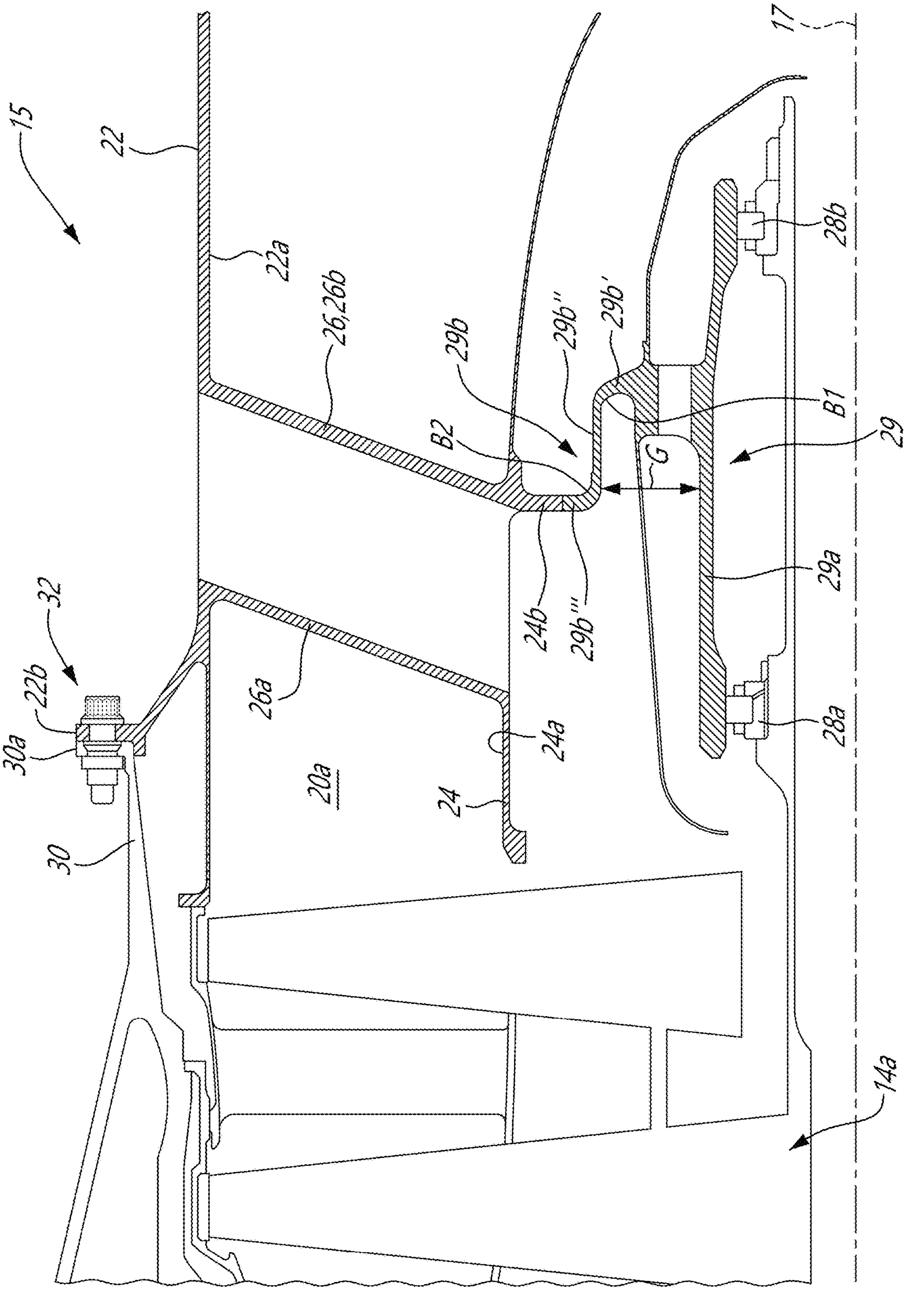
FIG. 3 is a longitudinal cross-section view of the exhaust case assembly illustrating details of a bearing flange connection between the bearing housing and the inner case of the TEC.

According to the embodiment shown in FIG. 1, the TEC 15 terminates the core gas path 20 of the engine 10. The TEC 15 is disposed immediately downstream of the last stage of the low pressure turbine rotor **14*a* for receiving hot gases therefrom and exhausting the hot gases to the atmosphere. As shown in FIGS. 1-3, the TEC 15 comprises an outer case 22 having a radially inner surface 22*a* forming a radially outer delimitation (i.e., outer gas path wall) of an annular exhaust path 20*a* of the core gas path 20, an inner case 24 having a radially outer wall 24*a* forming a radially inner delimitation (i.e. inner gas path wall) of the annular exhaust path 20*a*, and a plurality of hollow struts 26 (e.g., 6 struts in the embodiment shown in FIG. 2) extending generally radially across the annular exhaust path 20*a*. As shown in FIG. 2, the struts 26 are circumferentially interspaced from one another. Each strut 26 has an airfoil shape extending chordwise between a leading edge wall 26*a* and a trailing edge wall 26*b*. The struts 26 structurally connect the inner case 24 to the outer case 22. According to some embodiments, the outer and inner cases 22, 24 are provided in the form of outer and inner structural rings concentrically mounted about the engine centerline 17**.

According to some embodiments, the TEC 15 (including the outer case 22, the inner case 24 and the struts 26) is of unitary construction. For instance, the TEC 15 may be integrally formed as a monolithic cast component. Still; according to some embodiments, the TEC 15 is cast from a superalloy of 58% nickel, 18-21% chromium, 12-15% cobalt, 3.5-8% molybdenum, 2.75-3.25% titanium, 1.2-1.6% aluminum, and other metals. According to other embodiments, the TEC 15 may be cast from Waspaloy®, a nickel-base, age hardenable superalloy.

As shown in FIG. 3, the outer case 22 of the TEC 15 may be bolted or otherwise suitably mounted to the downstream end of the turbine case 30 via a flange connection 32. For instance, as exemplified in FIG. 3, the outer case 22 can have an outer flange 22*b* bolted to a corresponding flange 30*a* at the downstream end of the turbine case 30. According to the illustrated embodiment, the inner case 24 is configured to support a pair of bearings 28*a*, 28*b* of the low pressure turbine rotor 14*a*. The bearings 28*a*, 28*b* are mounted inside a common bearing housing 29 concentrically mounted inside the inner case 24 of the TEC 15 around the engine centerline 17. The struts 26 provide a load path for transferring loads from the inner case 24 (and thus the bearings 28*a*, 28*b*) to the outer case 22.

During operation of a gas turbine engine, parts of the engine, such as the struts 26 of the TEC 15, are exposed to the hot combustion gases. When the gas turbine engine undergoes a transient event, such as when the gas turbine engine 10 goes from being off to started up, the combustion gases flowing through the TEC 15 heat up the struts 26 very quickly, particularly in compact engine designs. The rapid increase in temperature of the struts 26 exposed to the hot combustion gases may cause them to undergo thermal expansion at a greater rate than other parts (e.g., the bearing housing 29) that are not directly exposed to the hot combustion gases. Such a thermal mismatch between the struts 26 of the TEC 15 and the bearing housing 29 mounted to the inner case 24 of the TEC 15 may lead to thermally-induced stresses in the connection between the bearing housing 29 and the TEC 15. Stress concentrations in the connection between the TEC 15 and the bearing housing 29 may shorten the service life of the exhaust case assembly. As will be seen hereinafter, the stress concentrations in the connection between the TEC 15 and the bearing housing 29 can be reduced and, thus, the durability of the exhaust case assembly improved by designing the connection so as to better accommodate the transient thermal growth differential between the struts 26 of the TEC 15 and the bearing housing 29.

As shown in FIG. 3, the bearing housing 29 has a tubular body 29*a* extending longitudinally around the central axis 17. The tubular body 29*a* has an outer flange 29*b* extending integrally from its radially outer surface at an intermediate axial location between the first and second bearings 28*a*, 28*b*. The outer flange 29*b* is configured in the form of a tubular extension along an intermediate portion of the tubular body 29*a*. More particularly, the flange 29*b* has a first segment 29*b*' projecting generally radially outwardly from the outer circumference of the tubular body 29*a*, a second segment 29*b*" projecting axially forwardly from the first segment 29*b*' and a third segment 29*b*" projecting radially outwardly from the second segment 29*b*" to a radially outer circumferential surface. The second segment 29*b*" is tubular and spaced radially from the tubular body 29*a* by an annular gap G, thereby forming a double-tube shape along an intermediate portion of the bearing housing 29. The flange 29*b* defines a first bent B1 from radial to axial between the first and second segments 29*b*', 29*b*" and a second bent B2 from axial to radial between the second and third segments 29*b*", 29*b*'". The first and second bents B1, B2 have their respective radius of curvatures which are selected to minimize stress concentrations. According to some embodiments, the radially outer circumferential surface at the distal end of the third segment 29*b*'" is welded to a corresponding circumferentially extending surface of a mating flange 24*b* projecting radially inwardly from the inner case 24 of the TEC 15. The mating flange 24*b* of the inner case 24 of the TEC 15 may be provided in the form of a rib along an inner circumference of the inner case 24. Note that the weld interface or weld line is disposed outside of the stress concentration zones corresponding to the first and second bents B1, B2.

The tubular body 29*a*, the flange 29*b*, and other details forming part of the bearing housing 29 may be integrally formed as a unitary component. Furthermore, according to some embodiments, the bearing housing 29 may be manufactured by a forging method. The forging method exhibits stronger resistance to thermal stress and low-cycle fatigue compared to the casting method, which, as described above, may be used for manufacturing the TEC 15. According to some embodiments, the bearing housing 29 is forged from a superalloy of 58% nickel, 20-23% chromium, 0-1% cobalt, 8-10% molybdenum, 3.15-4.15% niobium and/or tantalum (Nb and/or Ta, hereinafter referred to as niobium), 0-0.4% titanium, 0-0.4% aluminum, and other metals. According to other embodiments, the bearing housing 29 is formed of Inconel® 625.

According to some embodiments, the material of the bearing housing 29 has a higher niobium content than the material of the TEC 15, and, accordingly, nickel and niobium can combine to form precipitates at a high temperature of about 998K, and these precipitates completely dissolve at a higher temperature around 1148K. Accordingly, the bearing housing 29 can exhibit enhanced recovery characteristics against high temperatures and low-cycle fatigue.

In the low-cycle fatigue life tests for casting the TEC 15 with Waspaloy® and forging the bearing housing 29 with Inconel® 625, it has been experimentally observed that when subjected to the same stress level, the life of components forged from Inconel® 625 is approximately double that of those casted from Waspaloy®, as demonstrated on a logarithmic scale.

By integrating the flange 29*b* to the bearing housing 29 rather than to the TEC 15 and by configuring it as described above, it may, thus, be possible to improve the durability of the exhaust case assembly of the engine 10. Indeed, the material composition of the flange 29*b*, the technique used to manufacture the flange 29*b* of the bearing housing 29 (e.g., forging) and its dimensional arrangement, and/or any combination thereof may contribute to improve the durability of the connection between the TEC 15 and the bearing housing 29.

For instance, as shown in FIG. 3, the second segment 29*b*" of the outer flange 29*b* of the bearing housing 29 may be thinner than other parts of the bearing housing 29, including the wall thickness of the tubular body 29*a*, to provide a flexible joint to accommodate the thermal expansion of the struts 26 during transient events, such as during start up. Indeed, the flange 29*b* may be designed to act as a "hinge" or hairpin joint to accommodate the radial growth of the struts 26. Stated differently, the dimensional arrangement, the material and/or the technique used to produce the flange 29*b* of the bearing housing 29 may be selected to allow it to be "resiliently deformable". By "resiliently deformable", it is herein understood that the flange 29*b* displaces by deforming temporarily and returns to its original shape in response to a radial displacement of parts of the TEC 15 due to thermal expansion. More particularly, the temporary deformation of the flange 29*b* of the bearing housing 29 is caused by the thermal expansion of the struts 26. The flange 29*b* returns to its default shape and position when thermal expansion has ceased. The flange 29*b*, thus, acts like a live hinge to accommodate temporary thermal expansion of the struts 26 during engine transient events. Again, the resilient deformability of the flange 29*b* and its resistance to low-cycle fatigue may result from its material composition, from the technique used to manufacture the portion, from its dimensional arrangement, and/or from any combination of the preceding factors.

From the foregoing, it can be appreciated that the above described connection between the TEC 15 and the bearing housing 29 helps to reduce high stress concentration at the junction between these two parts. This may help to provide a solution to a transient thermal stress issue, which may be more common on gas turbine engines 10 that are compact relative to the engine centerline 17. The TEC and bearing housing assembly disclosed herein may thus contribute to allowing for the installation of an exhaust case in an extreme high temperature and compact area of the gas turbine engine 10.

The TEC and bearing assembly described above may have additional features/characteristics which contribute to provide a solution to transient thermal stress issue. For example, and referring to FIG. 3, the junction (e.g., weld interface) of the inner flange 24*b* of the inner case 24 with the third segment 29*b*''' of the outer flange 29*b* may be generally axially aligned with the trailing edge wall 26*b* of the struts 26. As shown in FIG. 3, the inner flange 24*b* projecting radially inwardly from the inner case 24 of the TEC 15 extends from an axial location where the trailing edge wall 26*b* of the struts 26 merges with the inner case 24. The axial alignment of the trailing edge wall 26*b* of the struts 26 with the connection between inner flange 24*b* of the inner case 24 and the outer flange 29*b* of the bearing housing 29 allows the radial expansion of the struts 26 to be transmitted substantially radially inwardly to the distal end of the flange 29*b* opposite to the joint between the first and second segments 29*b*' and 29*b*'' of the flange 29*b*.

Referring to FIG. 3, there is disclosed herein a method of forming an exhaust case of the gas turbine engine 10. The method includes casting the TEC 15 and forging the bearing housing 29 with an outer flange 29*b*. The outer flange 29*b* is forged with a first segment 29*b*' projecting radially outwardly from the tubular body 29*a* of the bearing housing 29. The outer flange 29*b* is also forged with a second segment 29*b*'' projecting longitudinally around the tubular body 29*a* and a third segment 29*b*''' projecting radially outwardly from the second segment 29*b*''. The so forged bearing housing 29 is then positioned inside the TEC 15. Thereafter, the end surface of the third segment 29*b*''' of the outer flange 29*b* is welded to the mating flange 24*b* projecting radially inwardly from the inner case 24 of the TEC 15.

According to further exemplary embodiments, there is provided a combined structure of a turbine exhaust case and a bearing housing, the turbine exhaust case comprising a tubular outer case and a tubular inner case disposed inside the outer case, and a tubular bearing housing disposed inside the inner case; wherein the bearing housing comprises a tubular housing body, and an extension portion protruding radially outward from the outer surface of the housing body and extending in the longitudinal direction of the housing body; and the end of the extension is combined with the inner surface of the inner case.

According to such exemplary embodiments, the inner case may comprise a first connection section protruding in a radial direction from the inner surface, and the end of the extension portion of the bearing housing may be curved in a direction facing the end of the first connection section, thereby allowing the end of the extension to be coupled with the end of the first connection section.

Furthermore, according to some embodiments, the exhaust case and the bearing housing of the combined structure may be formed of a nickel alloy material, and the niobium or tantalum content in the exhaust case may be lower than the niobium or tantalum content in the bearing housing.

Additionally, in the combined structure, the exhaust case may be manufactured by a casting method, and the bearing housing may be manufactured by a forging method.

The combined structure of the turbine exhaust case and the bearing housing according to at least some embodiments is provided to have the portion where thermal stress is concentrated on the bearing housing, and uses materials and manufacturing methods that offer relatively superior low-cycle fatigue life characteristics on the bearing housing compared to the turbine exhaust case. As a result, there is an effect of maintaining durability even when thermal stress is concentrated.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term “connected” or “coupled to” may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms “comprises”, “comprising”, or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An exhaust case assembly for a gas turbine engine, comprising:

a turbine exhaust case (TEC) having an outer case extending around a central axis, an inner case concentrically disposed inside the outer case, an annular exhaust gas path radially between the outer case and the inner case, and a plurality of circumferentially spaced-apart struts extending across the annular exhaust gas path and structurally connecting the inner case to the outer case; and a pair of bearings including a first bearing and a second bearing housed in a common bearing housing concentrically disposed inside the inner case of the TEC, the bearing housing having a tubular body extending around the central axis from a first axial end to a second axial end, the first bearing and the second bearing respectively disposed at the first axial end and the second axial end of the tubular body, the bearing housing integrally formed with an outer annular flange, the outer annular flange having:

a first segment projecting radially outwardly from the tubular body at an intermediate axial location between the first bearing and the second bearing, a second segment projecting axially forwardly from the first segment to a distal end spaced axially forwardly from the intermediate axial location, and a third segment projecting radially outwardly from the distal end of the second segment to a radially outer circumferential surface disposed axially between the first bearing and the second bearing, the radially outer circumferential surface of the third segment joined to a corresponding radially inner circumferential surface of a mating flange projecting radially inwardly from the inner case of the TEC.

2. The exhaust case assembly of claim 1, wherein the plurality of circumferentially spaced-apart struts extends axially from a leading edge wall to a trailing edge wall, and wherein the mating flange of the inner case of the TEC is axially aligned with the trailing edge wall of the plurality of circumferentially spaced-apart struts and disposed axially between the first bearing and the second bearing.

3. The exhaust case assembly of claim 2, wherein the trailing edge wall merges with the inner case at a first axial location, and wherein the mating flange of the inner case is positioned at the first axial location.

4. The exhaust case assembly of claim 1, wherein the radially outer circumferential surface of the third segment is welded to the corresponding radially inner circumferential surface of the mating flange of the inner case of the TEC, the radially outer circumferential surface of the third segment and the radially inner circumferential surface of the mating flange forming a weld interface, the weld interface spaced axially from a first bent between the first segment and the second segment and radially outwardly from a second bent between the second segment and the third segment.

5. The exhaust case assembly of claim 4, wherein the first, second and third segments of the outer annular flange are configured to act as a hinge to accommodate temporary thermal expansion of the plurality of circumferentially spaced-apart struts of the TEC during engine transient events.

6. The exhaust case assembly of claim 1, wherein the outer annular flange of the bearing housing has a hairpin configuration including a first curvature from radial to axial between the first segment and the second segment and a second curvature from axial to radial between the second segment and the third segment.

7. The exhaust case assembly of claim 1, wherein the TEC and the bearing housing are made of nickel alloy materials, and wherein a niobium or tantalum content of the TEC is lower than the niobium or tantalum content of the bearing housing.

8. The exhaust case assembly of claim 1, wherein the TEC is casting, the bearing housing is a forging.

9. The exhaust case assembly of claim 1, wherein the TEC is a nickel-based superalloy casting, and wherein the bearing housing is a nickel-chromium-based superalloy forging.

10. A gas turbine engine comprising:

a turbine exhaust case (TEC) including an outer case extending around a central axis, an inner case concentrically disposed within the outer case, an annular exhaust gas path radially between the inner case and the outer case, and a plurality of struts extending across the annular exhaust gas path from the inner case to the outer case; and a pair of bearings including a first bearing and a second bearing housed in a common bearing housing concentrically disposed inside the inner case of the TEC; the bearing housing having a tubular body extending around the central axis and an outer flange projecting from a radially outer surface of the tubular body at an intermediate axial location between the first bearing and the second bearing, the outer flange having an axially extending segment spaced from the radially outer surface of the tubular body by an annular gap, the axially extending segment having a distal end spaced axially forwardly from the intermediate axial location, the distal end of the axially extending segment connected to a mating flange projecting radially inwardly from the inner case of the TEC at an axial location between the first bearing and the second bearing.

11. The gas turbine engine of claim 10, wherein the TEC and the bearing housing are made of nickel alloy materials, and wherein a niobium or tantalum content of the TEC is lower than the niobium or tantalum content of the bearing housing.

12. The gas turbine engine of claim 10, wherein the TEC is made of a casting, the bearing housing is a forging.

13. The gas turbine engine of claim 10, wherein the TEC is a nickel-based superalloy casting, and wherein the bearing housing is a nickel-chromium-based superalloy forging.

14. The gas turbine engine of claim 10, wherein a wall thickness of the axially extending segment of the outer flange is less than that of the tubular body of the bearing housing.

15. The gas turbine engine of claim 10, wherein the outer flange of the bearing housing comprises a first radial segment between the tubular body and the axially extending segment and a second radial segment between the axially extending segment and the mating flange of the inner case of the TEC, and wherein the second radial segment is welded to the mating flange of the inner case at an interface parallel to the central axis.

16. The gas turbine engine of claim 10, wherein the mating flange of the inner case is axially aligned with a trailing edge wall of the plurality of struts.

* * * * *